(12) United States Patent
Gopalakrishnan (10) Patent No.: US 6,795,595 B2
(45) Date of Patent: Sep. 21, 2004

(54) OPTICAL MODULATOR WITH PROGRAMMABLE CHIRP

(75) Inventor: Ganesh K. Gopalakrishnan, Bethesda, MD (US)

(73) Assignee: Codeon Corporation, Columbia, MD (US)

(*) Notice: Subject to any disclaimer, the term of this patent is extended or adjusted under 35 U.S.C. 154(b) by 276 days.

(21) Appl. No.: 09/971,643

(22) Filed: Oct. 9, 2001

(65) Prior Publication Data

US 2003/0068111 A1 Apr. 10, 2003

(51) Int. Cl.[7] .............................. G02F 1/295
(52) U.S. Cl. ............ 385/4; 385/8; 385/9; 385/39; 385/40
(58) Field of Search .................. 385/1.2, 4, 8, 9, 385/39–42, 45; 359/237, 245, 254

(56) References Cited

U.S. PATENT DOCUMENTS

| | | | |
|---|---|---|---|
| 5,074,631 A | | 12/1991 | Hamano et al. |
| 5,303,079 A | | 4/1994 | Gnauck et al. |
| 5,408,544 A | | 4/1995 | Seino |
| 5,526,448 A | * | 6/1996 | Nagata et al. ............... 385/1 |
| 5,757,990 A | * | 5/1998 | Miyakawa ................. 385/16 |
| 6,069,729 A | * | 5/2000 | Gill et al. ................. 359/245 |
| 6,381,379 B1 | * | 4/2002 | Burns ......................... 385/2 |
| 6,545,791 B1 | * | 4/2003 | McCaughan et al. ...... 359/245 |
| 6,567,203 B1 | * | 5/2003 | Hill et al. .................. 359/254 |
| 2002/0131665 A1 | * | 9/2002 | Sriram et al. ................ 385/2 |

OTHER PUBLICATIONS

Pisu Jiang, et al. "LiNbO$_3$ Mach–Zehnder Modulators with Fixed Negative Chirp", IEEE Photonics Technology Letters, vol. 8, No. 10, pp. 1319–1321 Oct. 1996.

Ed L. Wooten et al, "A Review of Lithium Niobate Modulators for Fiber–Optic Communications Systems" IEEE Journal of Selected Topics in Quantum Electronics, vol. 6, No. 1, pp. 69–82, Jan./Feb.

* cited by examiner

Primary Examiner—Rodney Bovernick
Assistant Examiner—Juliana K. Kang
(74) Attorney, Agent, or Firm—Morgan Lewis & Bockius LLP (57) ABSTRACT

A programmable chirp optical modulator is provided having programs modes of chirp. The modulator includes an optical modulation chip substrate having an electrooptic property; a waveguide that runs across the optical modulation chip, wherein the waveguide includes a first main channel branching into separate parallel first and second waveguide arms that combine into a second main channel; a first coplanar-strip electrode overlying and running along the first waveguide arm; a second electrode overlying and running along the second waveguide arm; and at least one programmable electrode overlying the substrate and adjacent to the second electrode on a side of the second coplanar-strip electrode opposite a side of the second coplanar-strip electrode where the first coplanar-strip electrode is located. The at least one programmable electrode runs in parallel with the second electrode as the second electrode runs along the second waveguide arm.

13 Claims, 12 Drawing Sheets

OPTICAL MODULATOR WITH PROGRAMMABLE CHIRP

BACKGROUND OF THE INVENTION

1. Field of the Invention

The present invention relates to an optical based communications network, and more particularly to an optical modulator that is programmable in terms of the amount of chirp that is imparted on the modulated optical signal from the optical modulator.

Introduction

In a general fiber optical communication system, optical signals are sent along an optical fiber communication line to a desired location. One type of the fiber optical communication system that can handle optical signals of multiple channels through wavelength multiplexing is called a wavelength division multiplexed (WDM) system. Chirp is a typical problem in these type of systems. Chirp is the instantaneous broadening of the wavelength (and hence frequency) of the optical carrier. Depending on the particular systems application, chirp could either be desirable or undesirable. At the commonly used communications wavelength of 1550 nm, the conventional single mode fiber exhibits significant dispersion. An optical pulse that is broadened on account of chirp can interact with the dispersion in the fiber and impair the fidelity of data transmission. In this case, chirp is undesirable. However, a compressed (i.e. negative chirped) pulse can evolve over a length of fiber to restore its normal shape, thereby the enhancing fidelity for data transmission. In this case, negative chirp at the point of signal origination may be desirable.

In External Optical Modulators (EOMs), chirp $\alpha$ can be set to a positive (+$\alpha$), negative (-$\alpha$) or zero (0) value. The amount of chirp required can be link specific. For example, optical links of different lengths or other physical differences between optical links often require different chirp values to counteract the effect of fiber dispersion. Therefore, it is desirable to design EOMs with an adjustable chirp value to provide for dispersion compensation as required in an arbitrary optical link.

2. Discussion of the Related Art

Previously, zero chirp, non-zero adjustable chirp, and fixed non-zero chirp modulators have been respectively demonstrated in U.S. Pat. Nos. 5,074,631, 5,303,079 and 5,408,544, all of which are expressly incorporated by reference, so-called, zero chirp (U.S. Pat. No. 5,074,631) and non-zero adjustable chirp (U.S. Pat. No. 5,303,079) EOMs have been based on a dual signal electrode design. Non-zero fixed chirp modulators (U.S. Pat. No. 5,408,544) have been implemented either in a single input signal electrode or a dual input signal electrode design. However, there are several drawbacks related to the foregoing related art design of modulators with adjustable or set chirp value.

For applications requiring a tunable chirp modulator, the tunable two-electrode design described in U.S. Pat. No. 5,303,079 is cumbersome to implement. In such a tunable chirp design, a second input signal is connected to a second input signal electrode and is typically derived from a signal that is input into a first input signal electrode. Such tunable designs require an increase in drive circuitry needed for operating an optical modulator because they require two signal electrode drivers, and thus cause an increase in device complexity, size and/or cost. Moreover, it is difficult to precisely set the phase and amplitude balance of the drive signals applied to the two input signal electrodes at high grade rates.

Figure 1:
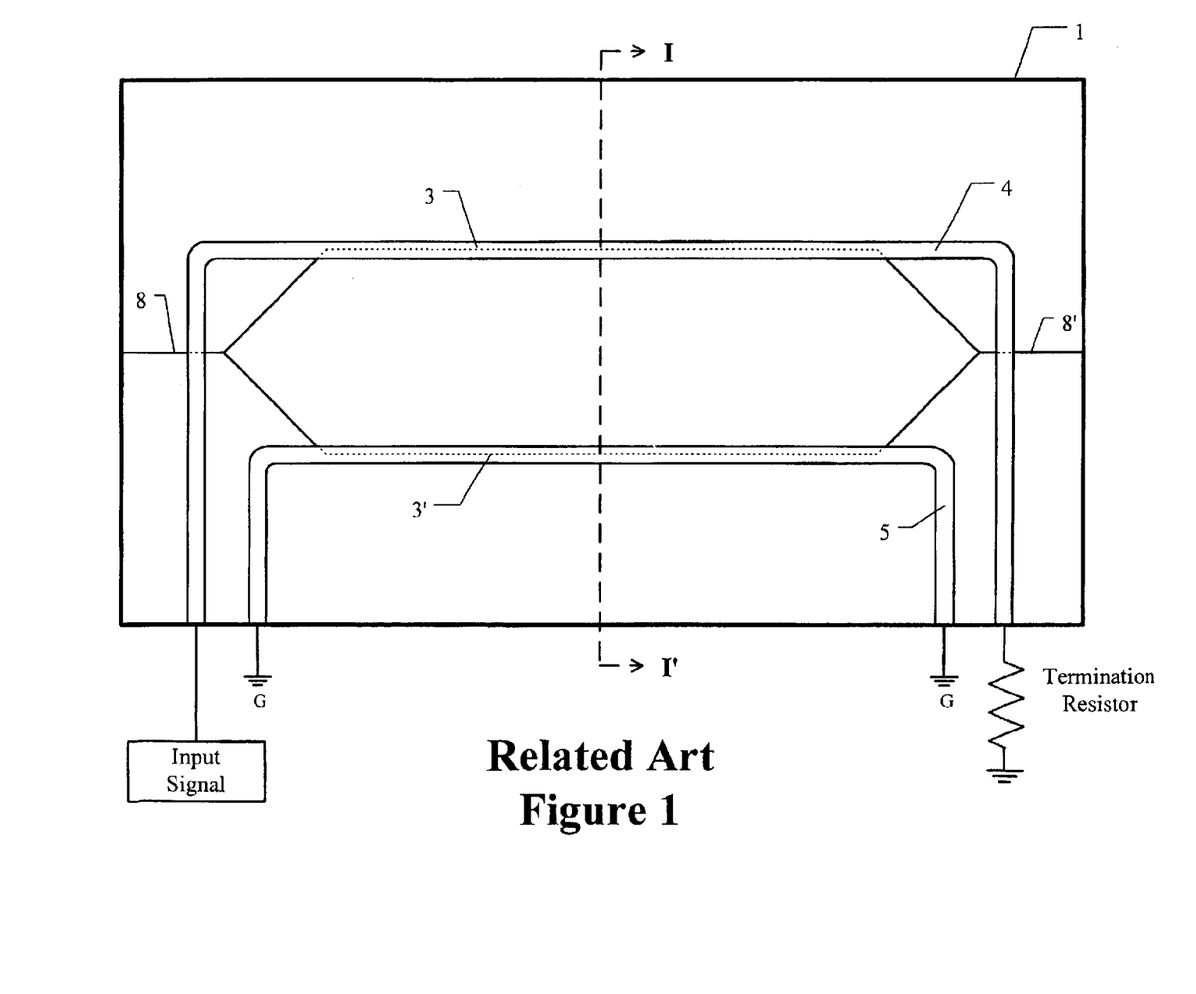
FIG. 1 is a plan view of a related art external optical modulator (EOM) having a coplanar-strips (CPS) electrode structure.
Figure 2:
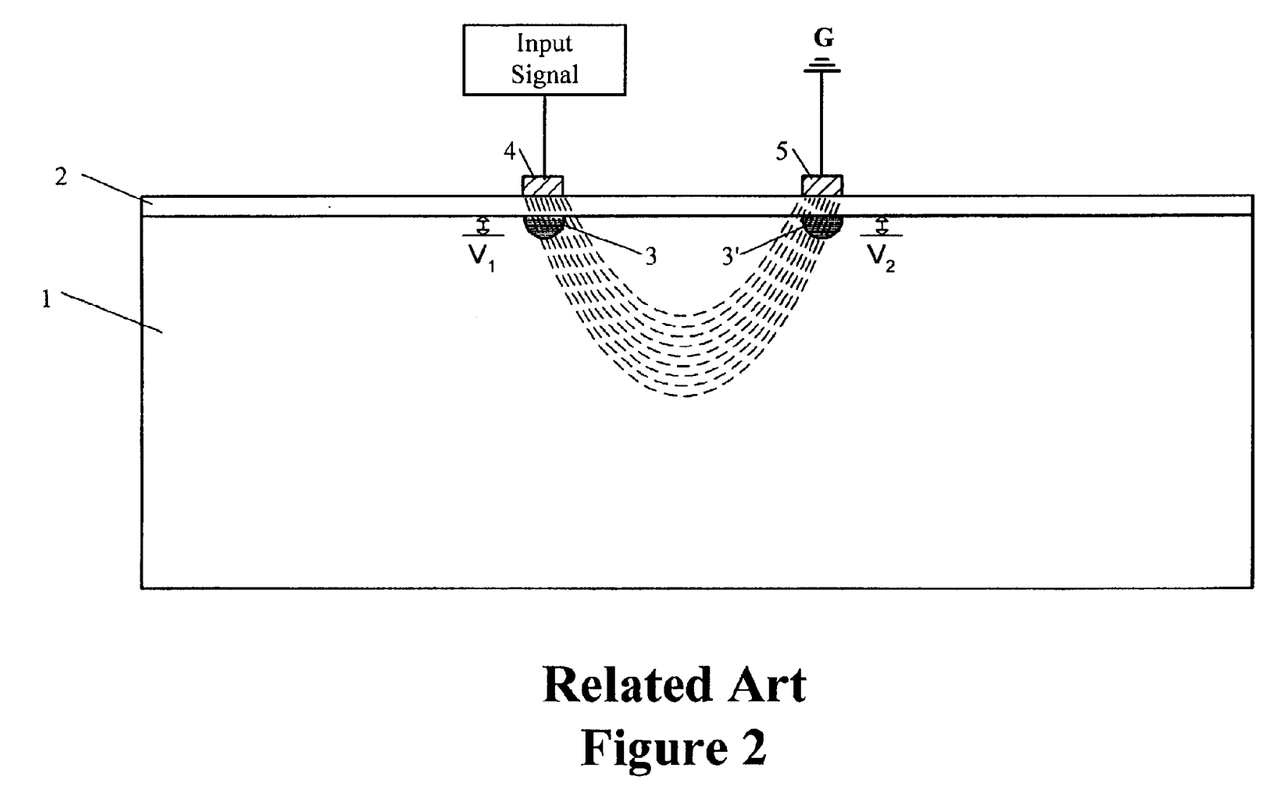
FIG. 2 is a cross-sectional view of a related art EOM illustrative of zero chirp resulting from symmetric electric field lines.

FIGS. 1 and 2 illustrate a zero chirp type optical modulator of the related art. FIG. 1 is a plan view of a single input signal electrode related art EOM and FIG. 2 is a cross-section of FIG. 1 taken along line I–I'. As shown in FIG. 1, the related art EOM includes an optical modulation chip 1 having an electrooptical effect. The optical modulation chip 1 includes a waveguide, such as a Mach-Zehnder Interferometer (MZI), that runs from one to another end of the chip. The waveguide includes a first main channel 8 that branches into separate parallel paths along respective first and second waveguide arms 3, 3' near one end of the chip 1. Near the other end of the chip 1, the arms 3, 3' come back together as a second main channel 8' at the other end of the chip. Directly overlying the first waveguide arm 3 is a first coplanar-strip (CPS) electrode 4 for connecting an input signal. One end of the first CPS electrode 4 is connected to the input signal and the other end of the signal electrode is connected to a termination resistor. Alternatively, both ends of the first CPS electrode 4 can be connected to independent signal sources. Directly overlying the second arm 3' is a second CPS electrode 5 for connecting to ground. Both ends of the second CPS electrode 5 are connected to ground G.

FIG. 2 shows optical waveguide arms 3, 3' that correspond to the two arms 3, 3' of the interferometer shown in FIG. 1. The waveguide arms are regions within an optical modulator chip 1 (e.g., LiNbO$_3$). An insulating buffer layer 2 (e.g., SiO$_2$) is provided on the optical modulator chip 1 between the CPS electrodes 4, 5 and the waveguide arms 3, 3'. The electrode structure of FIGS. 1 and 2 is a CPS electrode structure. In FIG. 2 the dashed lines show a representation of how the electric field lines emanate from the signal CPS electrode 4 and are received by the ground CPS electrode 5 so as to interact with the optical signals as they pass through the optical waveguide arms 3, 3'. The electric field lines shown are not indicative of the actual path that electric field lines would take between the signal and ground CPS electrodes as the electric fields pass through the body of the optical modulator chip 1. However, the electric field lines shown are generally indicative of electric field lines that go through the waveguide arm 3 from the signal CPS electrode 4 and out through waveguide arm 3 to the ground CPS electrode 5.

As shown in FIG. 2, the CPS electrode structure has a symmetric electric field lines that interact with the waveguide branches in a push-pull manner, which results in a modulator output having no chirp. The chirp parameter |$\alpha$| of an EOM is directly proportional to the asymmetry in the V of the two arms of the interferometer. As depicted in FIG. 2, V is the potential across a cross-section of a waveguide arm. Chirp parameter |$\alpha$| is defined as a proportion of the V on one arm of the interferometer with respect to the V of the other arm of the interferometer as follows:

$$|\alpha| = \left| \frac{V_2 - V_1}{V_2 + V_1} \right| \quad (1)$$

where $V_2$ is the potential across a waveguide arm 3' and $V_1$ is the potential across a waveguide arm 3 from the surface of the waveguide arm. The electric fields as shown in FIG. 2 show the chirp $\alpha$ to be zero because $V_2$ equals $V_1$. It also can be seen from the equation (1) above that when $V_2$ does not equal $V_1$, chirp is present in the modulator output.

Figure 3:
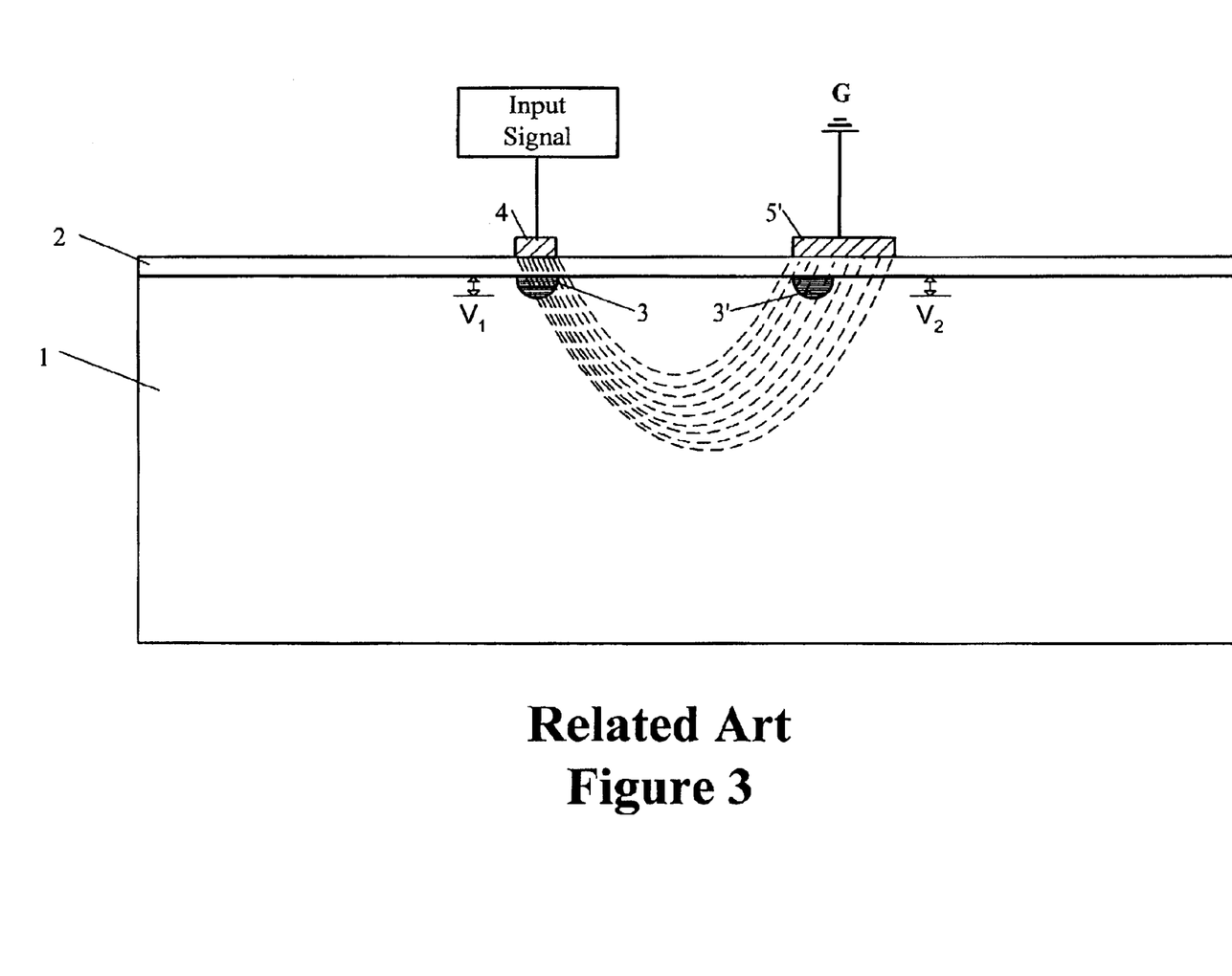
FIG. 3 is a cross-sectional view of a related art EOM illustrative of chirp resulting from asymmetric electric field lines.

FIG. 3 shows one related art approach for causing chirp in an EOM having a single input signal electrode by causing electric field asymmetry (i.e., a structure where $V_2 \neq V_1$) in the CPS structure. This can be accomplished with an asymmetric CPS structure by changing the width of the ground plane. As shown in FIG. 3, the width of the ground plane has been changed by widening the ground CPS electrode 5'. As a result of the change in width of the ground CPS electrode 5', the electric field lines are more spread out with regard to arm 3'. Therefore, $V_2$ has a smaller value than $V_1$ and results in the modulated optical output of the modulator having chirp.

While the related art modulator of FIG. 3 can be designed with a desired chirp value, the chirp parameter of the modulator is fixed to a single value. In contrast to the above-described dual input signal adjustable chirp modulator, a non-zero fixed chirp modulator including only one input signal electrode cannot be tuned for different values of chirp, and hence is not an attractive design approach for applications where a chirp requirement for a link is unknown. This design constraint would require building a special EOM with a fixed chirp for every conceivable link requirement, resulting in increased costs and impractical design complexity.

It would be desirable to have a single input signal electrode programmable chirp modulator that does not suffer from the drawbacks of the above-described approaches of the related art. Thus, there remains a need in the art for an EOM having programmable chirp in which the value of chirp for an EOM can be changed without the need of a second input signal electrode.

SUMMARY OF THE INVENTION

Accordingly, the present invention is directed to an optical modulator that substantially obviates one or more of the problems due to limitations and disadvantages of the related art.

In one aspect of the present invention, the chirp of an optical modulator is programmed utilizing only one input signal electrode.

In another aspect of the present invention, the chirp of an optical modulator is programmed utilizing only one ground electrode.

In a further aspect of the present invention, an external optical modulator (EOM) utilizing a single input signal electrode has a plurality of programmable chirp values.

In yet another aspect of the present invention, electric fields are selectively controlled through the arms of an interferometer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or corresponding parts.

The present invention is particularly useful in optical communications network systems that use interferometers to modulate optical signals into optical communications signals, such as wavelength division multiplexed (WDM) signals, over optical fibers.

Figure 4:
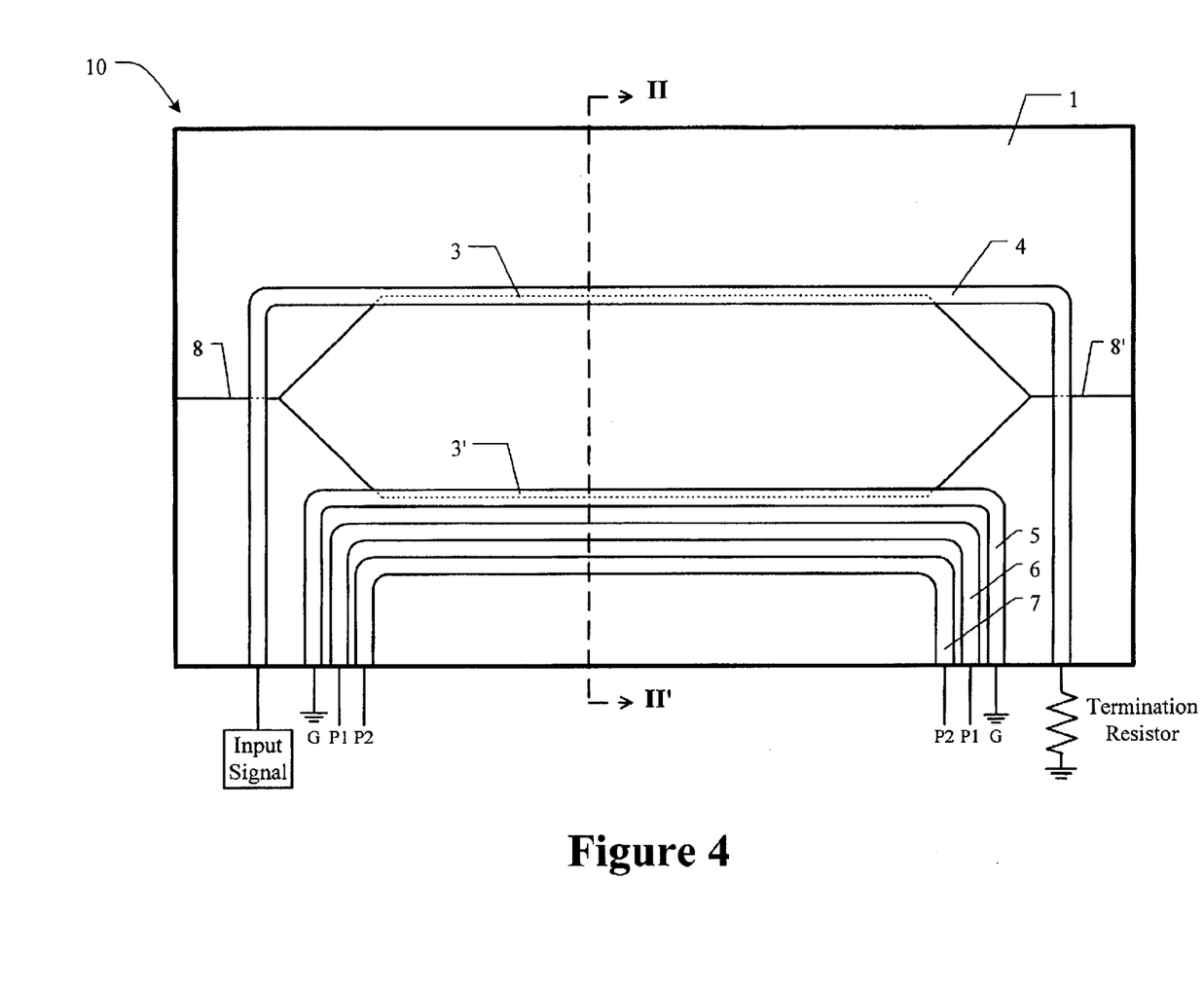
FIG. 4 is a plan view of an exemplary EOM in accordance with a first embodiment of the present invention.

FIG. 4 illustrates a plan view of an exemplary external optical modulator (EOM) 10 in accordance with a first embodiment of the present invention. The EOM 10 of the first embodiment includes an optical modulation chip 1 having an electrooptical property. For example, chip 1 may include a uniaxial crystal material such as lithium niobate ($LiNbO_3$) or another electrooptical material. The optical modulation chip 1 includes a waveguide within the optical modulation chip that extends from one end of the chip 1 to another end of the chip 1. As shown in FIG. 4, at one end of the chip 1 the waveguide may include of a first main channel section 8 that branches at a first junction into separate parallel first 3 and second 3' waveguide arms. At the other end of the chip 1, waveguide arms 3, 3' are coupled at a second junction and a second main channel section 8' extends from the second junction.

Directly overlying the first waveguide arm 3 is a first coplanar-strip (CPS) electrode 4 for connecting an input signal. One end of the first CPS electrode 4 is connected to an input signal and the other end of the signal electrode is connected to a termination resistor. Alternatively, both ends of the first CPS electrode 4 may be connected to independent signal sources, for example, a communication signal. Directly overlying the second arm 3' is a second CPS electrode 5 for connecting to ground. Both ends of the second electrode 5 are connected to ground. The first 4 and second 5 CPS electrodes will hereinafter be respectively referred to as the signal electrode 4 and the ground electrode 5.

In addition, FIG. 4 shows third 6 and fourth 7 CPS electrodes that overlie the optical modulator chip 1 adjacent to the ground electrode 5 (or second CPS electrode) on a side of the ground electrode opposite a side of the ground electrode where the signal electrode (or first CPS electrode) is located. The third 6 and fourth 7 CPS electrodes are parallel to the ground electrode 5 as the ground electrode runs above the second waveguide arm 3'. The third 6 and fourth 7 CPS electrodes will herein after be respectively referred to as the first and second programming electrodes since they can be biased to provide a programmed amount of chirp, described further below. However, in FIG. 4 the first and second programming electrodes are shown as unbiased (i.e., floating).

Figure 5:
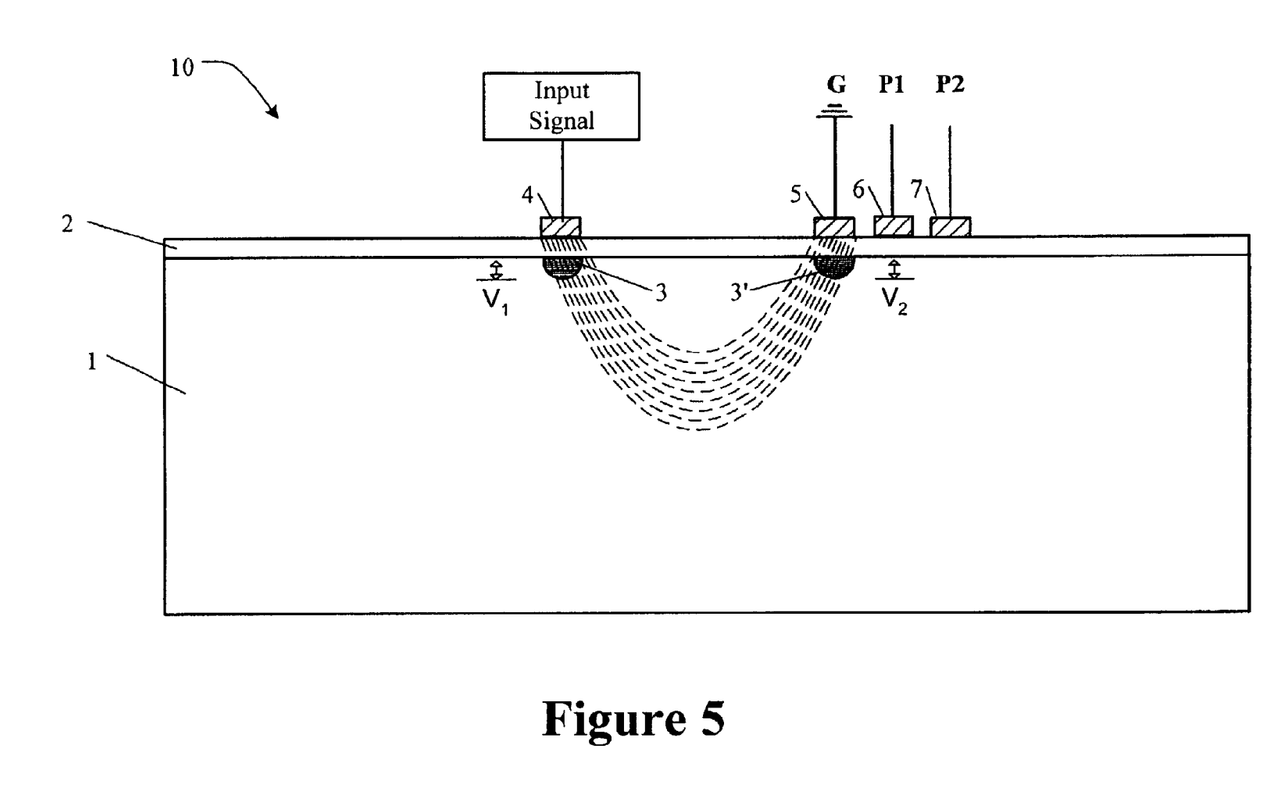
FIG. 5 is a cross-sectional view of the EOM of FIG. 4 in a first exemplary program mode.

Illustrated in FIG. 5 is a cross-section of the first exemplary embodiment along II–II' as shown in FIG. 4. FIG. 5 shows optical waveguide arms 3, 3' that correspond to the two waveguide arms of an interferometer. The waveguide arms are regions within an optical modulator chip 1 (e.g., $LiNbO_3$). An insulating buffer layer 2 (e.g., $SiO_2$) is provided on the optical modulator chip 1 between electrodes 4, 5 and the waveguide arms 3, 3'. Furthermore, the first programming electrode 6 and the second programming electrode 7 are located on the buffer layer 2 between the ground electrode 5 and the side of the optical modulator chip 1 parallel to a waveguide arm and nearest to the ground electrode 5.

FIG. 5 shows a first exemplary program mode of the first EOM embodiment of the present invention in which no bias is applied to programming electrodes 6, 7. Since programming electrodes 6, 7 are floating (i.e., no bias), electric field lines through the optical waveguide arms 3, 3' are nearly symmetric with respect to one another. This symmetry in the electric field results in zero chirp because $V_2$ equals $V_1$ in equation (1) above.

Figure 6:
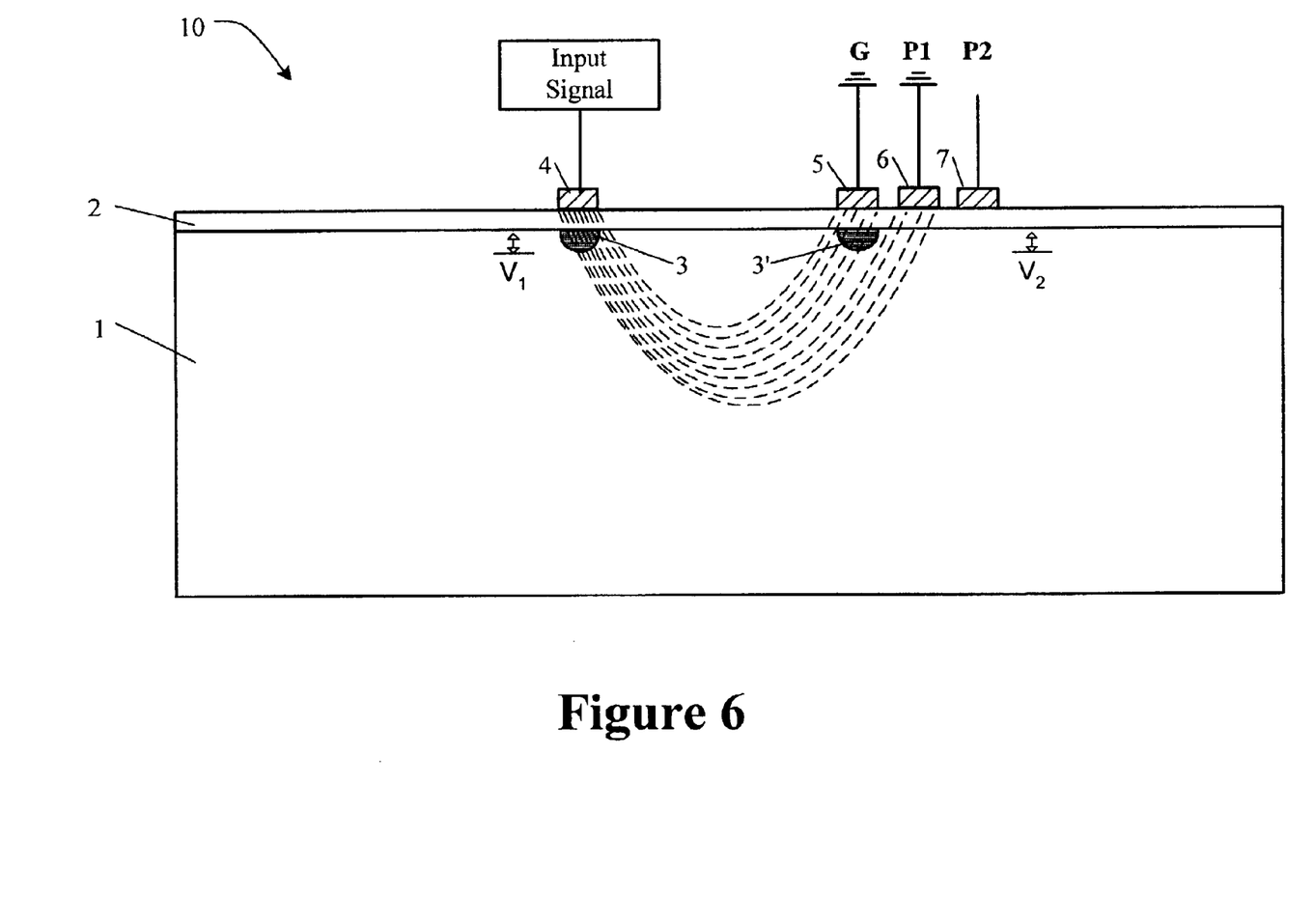
FIG. 6 is a cross-sectional view of the EOM of FIG. 4 in a second exemplary program mode.

To achieve a certain chirp value a, one or both of the programming electrodes may be connected to ground to selectively set the chirp parameter of the EOM at a predetermined value. FIG. 6 shows a second exemplary program mode for the first exemplary embodiment in which the first programming electrode 6 is connected to ground. The connection need not be permanent in that it can be done with a conductive paste, conductive paint, wire bond or other removable connecting structure that can be cut or removed to break a connection. One readily available ground source, for example, is a removable connection that may be made between electrodes 6 and ground electrode 5 via a shunt or a bridge. As shown in FIG. 6, since the first programming electrode 6 is grounded (i.e., P1=G), electric field lines in waveguide arm 3' are more spread out than electric field lines crossing waveguide arm 3' in the first embodiment described above. The larger spread of the electric field consequently leads to a smaller electric field intensity across waveguide arm 3' than across waveguide arm 3, and thus a $V_2$ that is smaller than $V_1$. This resulting potential difference between $V_2$ and $V_1$ corresponds to a first selected chirp value for the optical modulator output.

Figure 7:
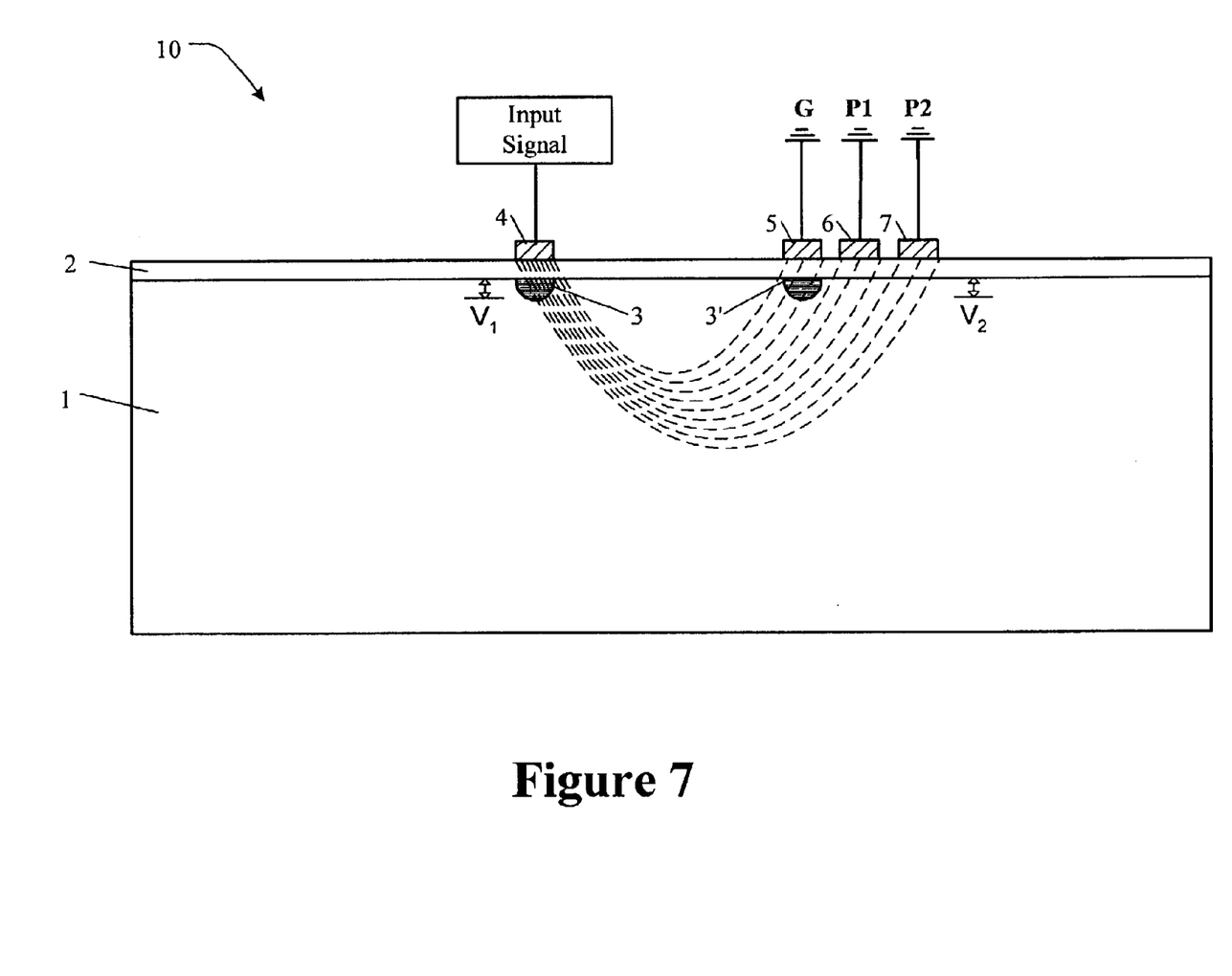
FIG. 7 is a cross-sectional view of the EOM of FIG. 4 in a third exemplary program mode.

FIG. 7 shows a third exemplary program mode for the first exemplary embodiment in which both the first programming electrode 6 and the second programming electrode 7 are connected or removably connected to ground (i.e., P1=P2= G). As shown in FIG. 7, a result of grounding both the first and second programming electrodes 6, 7 is that the electric field line spread across waveguide arm 3' is increased compared to the second program mode shown in FIG. 6. This increased electric field spread further reduces electric field intensity across waveguide arm 3', and thus results in a greater difference between potentials $V_2$ and $V_1$ The greater potential difference $V_2-V_1$ allows for a selecting a second chirp value that is greater than the one obtained in the foregoing second exemplary program modeent.

Figure 8:
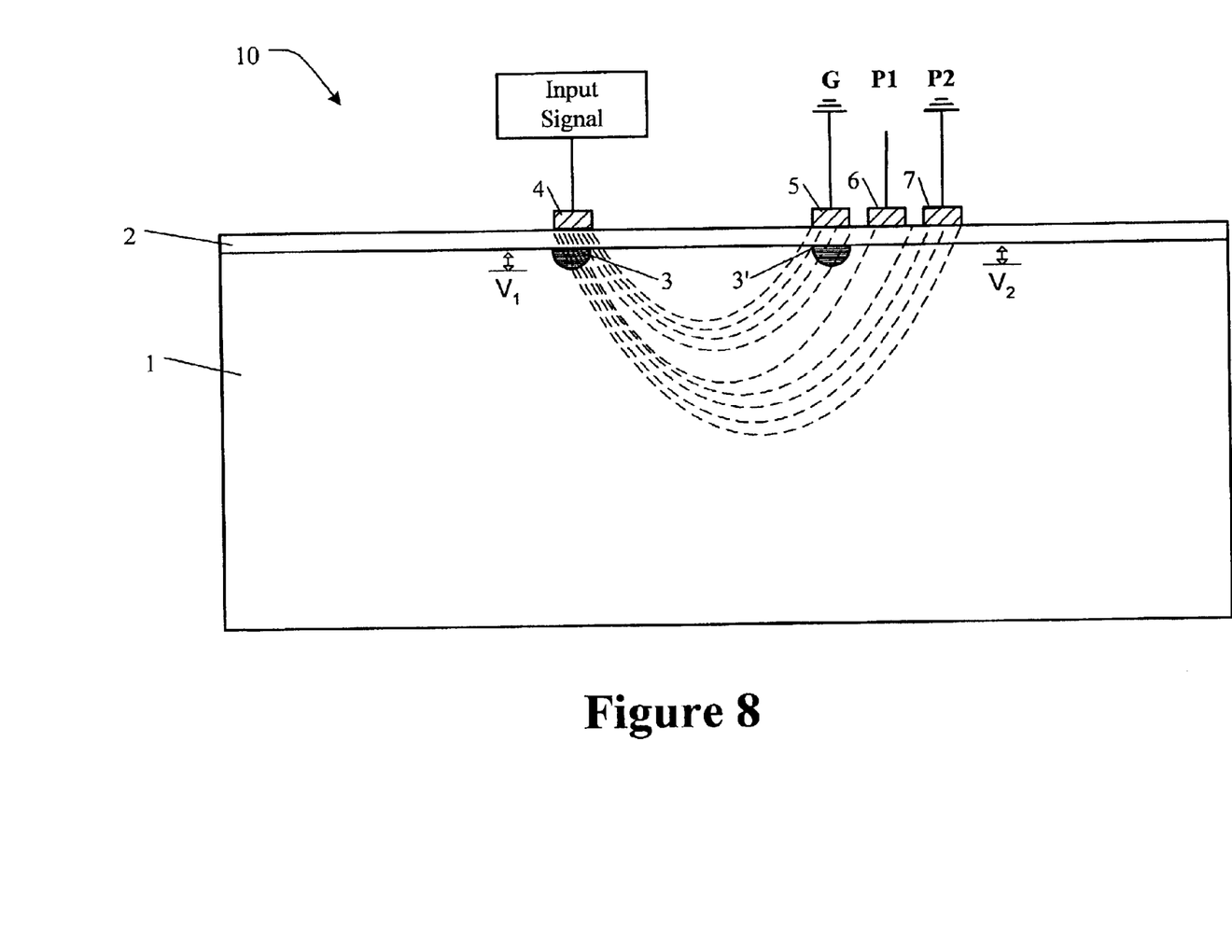
FIG. 8 is a cross-sectional view of the EOM of FIG. 4 in a fourth exemplary program mode.

FIG. 8 shows a fourth exemplary program mode for the first exemplary embodiment in which only the second programming electrode 7 is connected or removably connected to ground. As shown in FIG. 8, an electric field profile existing across waveguide arms 3, 3' is different than electric field profiles as illustrated in FIGS. 6 and 7, and hence a third selectable value of chirp may be obtained for EOM 10.

FIGS. 5, 6, 7 and 8 are exemplary ways of implementing programming electrodes in the external EOM 10. Of course, one programming electrode or more than two programming electrodes may be used to control the spread of electric field lines across the waveguide arm 3' of EOM 10. Moreover, while the first EOM 10 shown in FIG. 4 includes a single interferometer arrangement, this is only by way of example. It is to be understood that other waveguide arrangements may be used with the present invention. For example, a waveguide arrangement of the present invention may include multiple interferometers and/or include additional electrical or optical circuitry within. Furthermore, the optical waveguide may include more than two arm sections and/or may be provided with an asymmetrical waveguide arrangement.

Figure 9:
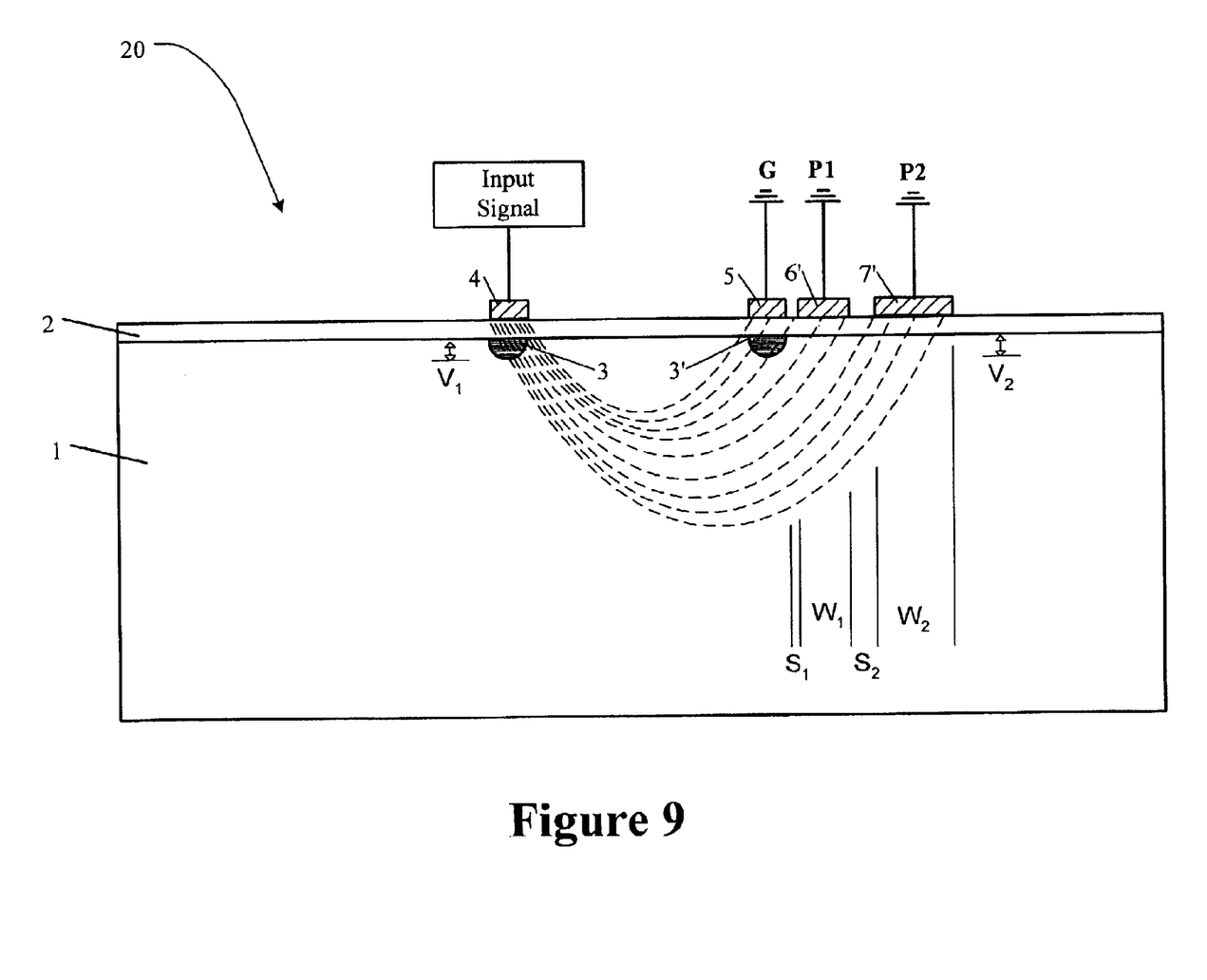
FIG. 9 is a cross-sectional view of an exemplary EOM illustrative of variation of width and spacing of programming electrodes in accordance with a second embodiment of the present invention.

FIG. 9 illustrates an exemplary EOM 20 in accordance with a second embodiment of the present invention where the width and/or spacing of the programming electrodes are varied to adjust a programmed chirp effect when programming electrodes are permanently or removably connected. As shown in FIG. 9, a width W and/or a spacing S of programming electrodes 6', 7' may be varied in order to obtain a desired set of programmable chirp values. The first programmable electrode 6' and the second programmable electrode 7' are located on a buffer layer 2 between a ground electrode 5 and a side of an optical modulator chip 1 nearest to the ground electrode 5 and parallel to a waveguide arm. The width $W_1$ of electrode 6' is wider than the width of electrode 5 and the width $W_2$ programming electrode 7' is wider than width $W_1$ of electrode 6'. In addition, the spacing $S_1$ between electrode 5 and electrode 6' is narrower than the electrode spacing $S_2$ between electrode 6' and electrode 7'.

It is to be understood that the electrode widths and spacing illustrated in FIG. 9 are exemplary and that other widths and/or spacing arrangements may be used in practicing the present invention. The present invention allows for an increased flexibility with the ability to vary spacing and/or the width of programming electrodes, which in turn provides additional degrees of freedom when designing an EOM for specific sets of chirp values obtainable in different program modes.

Moreover, adding more programming electrodes further diffuse electric fields outward, thereby causing additional asymmetry in V for one of the arms of the interferometer. Adding additional programming electrodes also may alter both the impedance and index of the electrodes. Furthermore, by appropriately choosing electrode pitch and dimensions (e.g., spacing and/or width), chirp adjustment can be achieved over a range of various impedance and indices.

Figure 10:
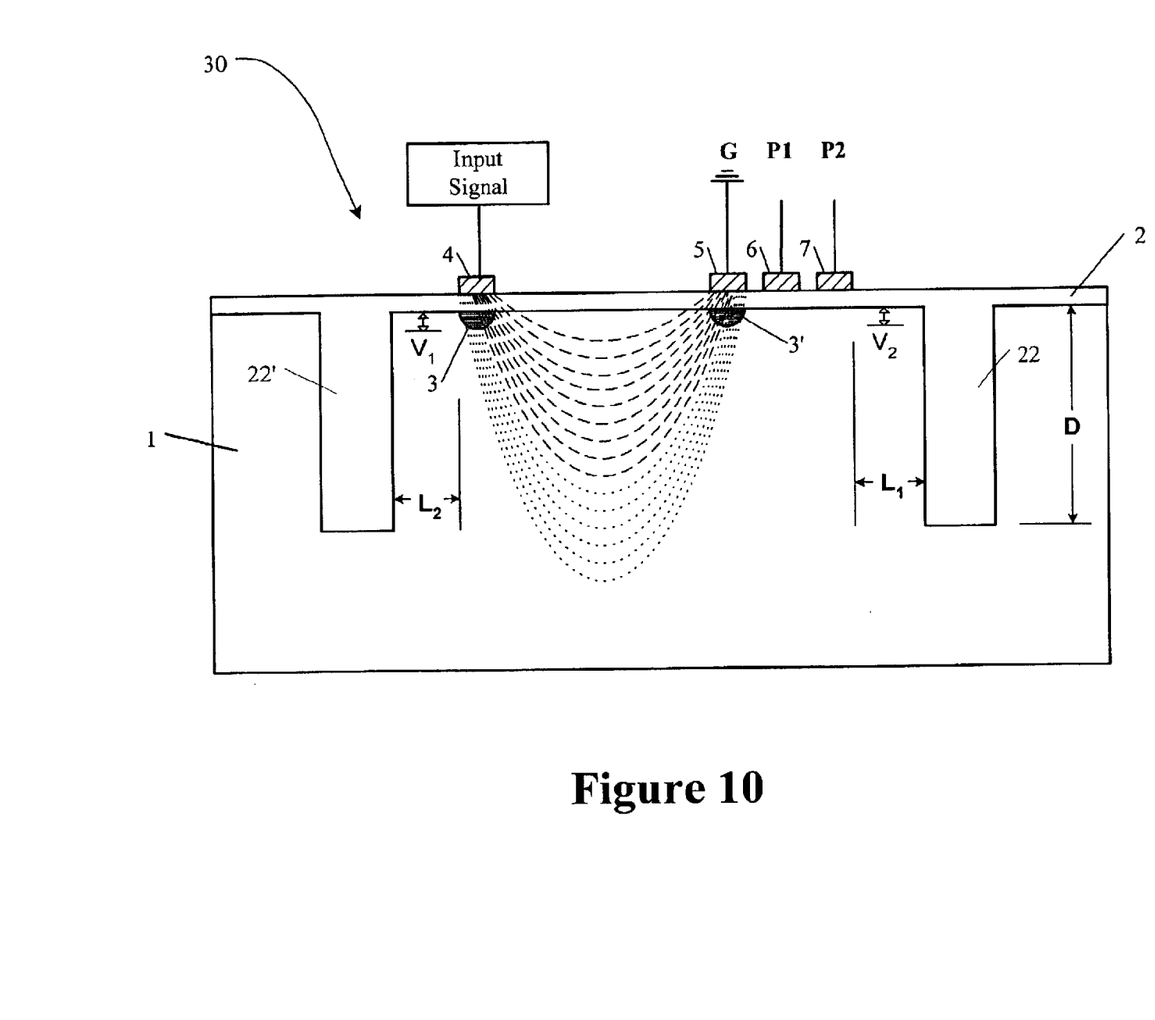
FIG. 10 is a cross-sectional view of an exemplary EOM in accordance with a third embodiment of the present invention and illustrative of a fifth exemplary program mode.

Smaller and more incremental program chirp values may be obtained by confining the electric field, and thus reducing the tendency of outward diffusion of electric field when it is desired to add more programming electrodes. FIG. 10 is a cross-section of a third exemplary EOM 30 in accordance with a third embodiment of the present invention that utilizes field confinement and an exemplary fifth program mode. As shown in FIG. 10, EOM 30 includes a first programmable electrode 6 and second programmable electrode 7 that are located on a buffer layer 2 between a ground electrode 5 and a first side of an optical modulator chip 1 nearest to the ground electrode 5. In addition, EOM 30 includes a first trench 22 in the optical modulator chip 1 located between the programming electrode closest to the first side of the optical modulator and the first side of the optical modulator chip 1. A second trench 22' is located between a signal electrode 4 and the other second side of the optical modulator chip 1. Both of the trenches 22, 22' may either be open or filled with an insulating material (e.g., $SiO_2$). The trenches 22, 22' may be two single trenches on each side of the optical modulator chip 1 or a single trench that runs along the perimeter of the optical modulator chip 1.

As shown in FIG. 10, there is an increase in an electric field that interacts with waveguide arms 3, 3' due to the confinement of the electric field within a confinement space by the trenches 22, 22'. The dotted electric field lines in EOM 30 represent the added electric fields that interact with waveguide arms 3, 3'. The confinement space is defined by the depth D of the trenches 22, 22', the horizontal distance length $L_1$ between the signal electrode 4 and the trench 22' on one side of the optical modulator chip 1, and the horizontal distance length $L_2$ between the second (or last) programming electrode 7 and the trench 22 on the other side of the optical modulator chip 1. The depth D of the trenches, and the respective horizontal distance lengths $L_1$ and $L_2$ of the trenches to the signal electrode and the program electrodes, are variables for controlling and/or varying an electric field intensity that interacts with the waveguide arms 3, 3'.

Figure 11:
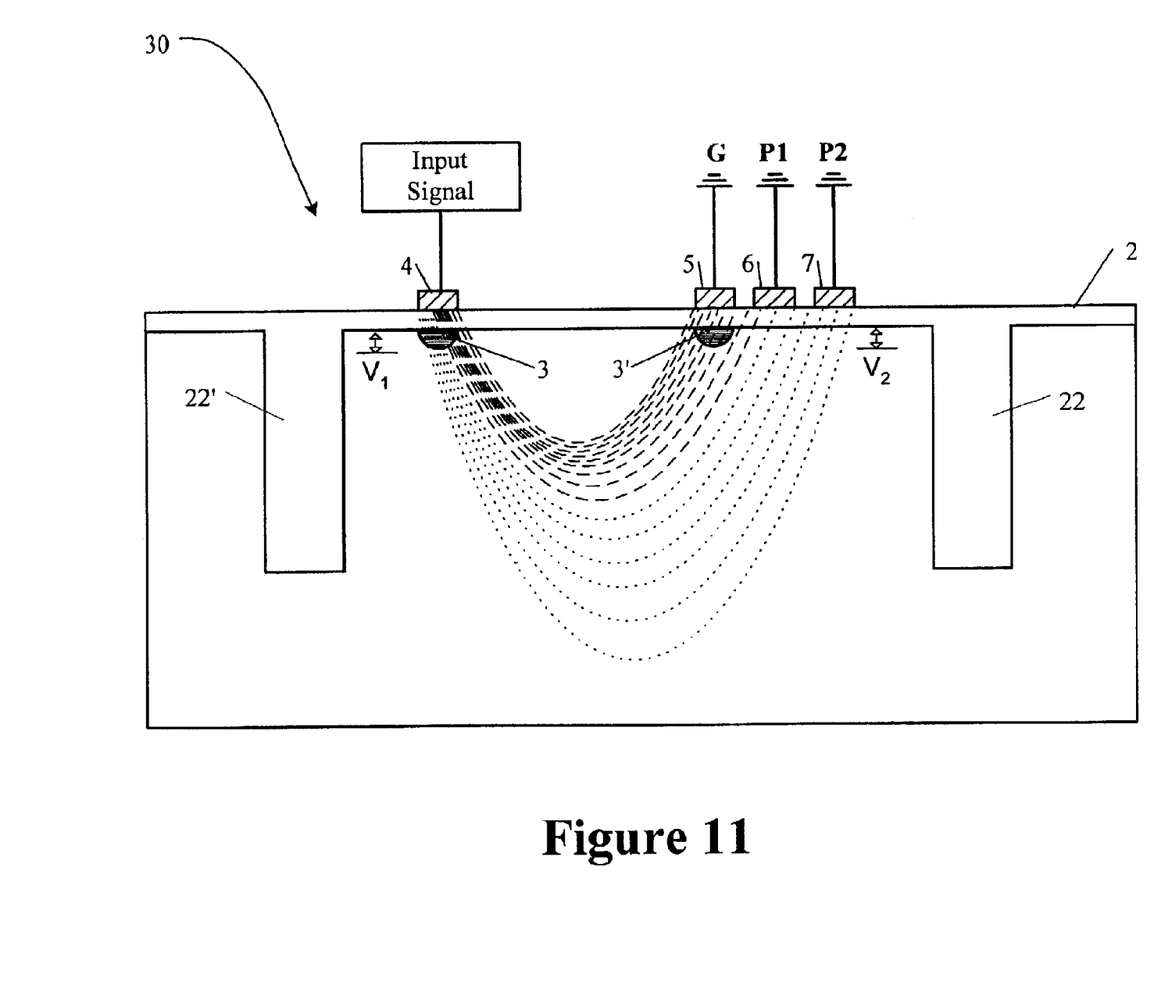
FIG. 11 is a cross-sectional view of the EOM of FIG. 10 in a sixth exemplary program mode.

FIG. 11 shows sixth exemplary program mode for the third embodiment in which both the first programming electrode 6 and second programming electrode 7 are permanently or removably connected to ground. As shown in FIG. 11, because the first and second programming electrodes 6, 7 are grounded, electric field lines are spread further outward in waveguide arm 3' compared to EOM 30 shown in FIG. 10. However, confinement of the electric field lines by the trenches limits the spread of the electric fields relative to the spread of electric fields in a non-confined situation, such as shown in FIG. 7. This reduced tendency for electric fields to spread outward means that smaller and more incremental program chirp values may be obtained by including additional programming electrodes.

The first through third embodiments are representative of chirp program modes that are predetermined based upon the spacing, number and/or width of the electrodes. However, choice of dimensions D, $L_1$ and $L_2$ to tailor the electric field confinement space allows for additional degrees of freedom, which may be used together with choice of electrode width and/or spacing and/or the number of program electrodes, as described above, to enable design of a programmable chirp modulator having a desired set of chirp program modes.

Figure 12:
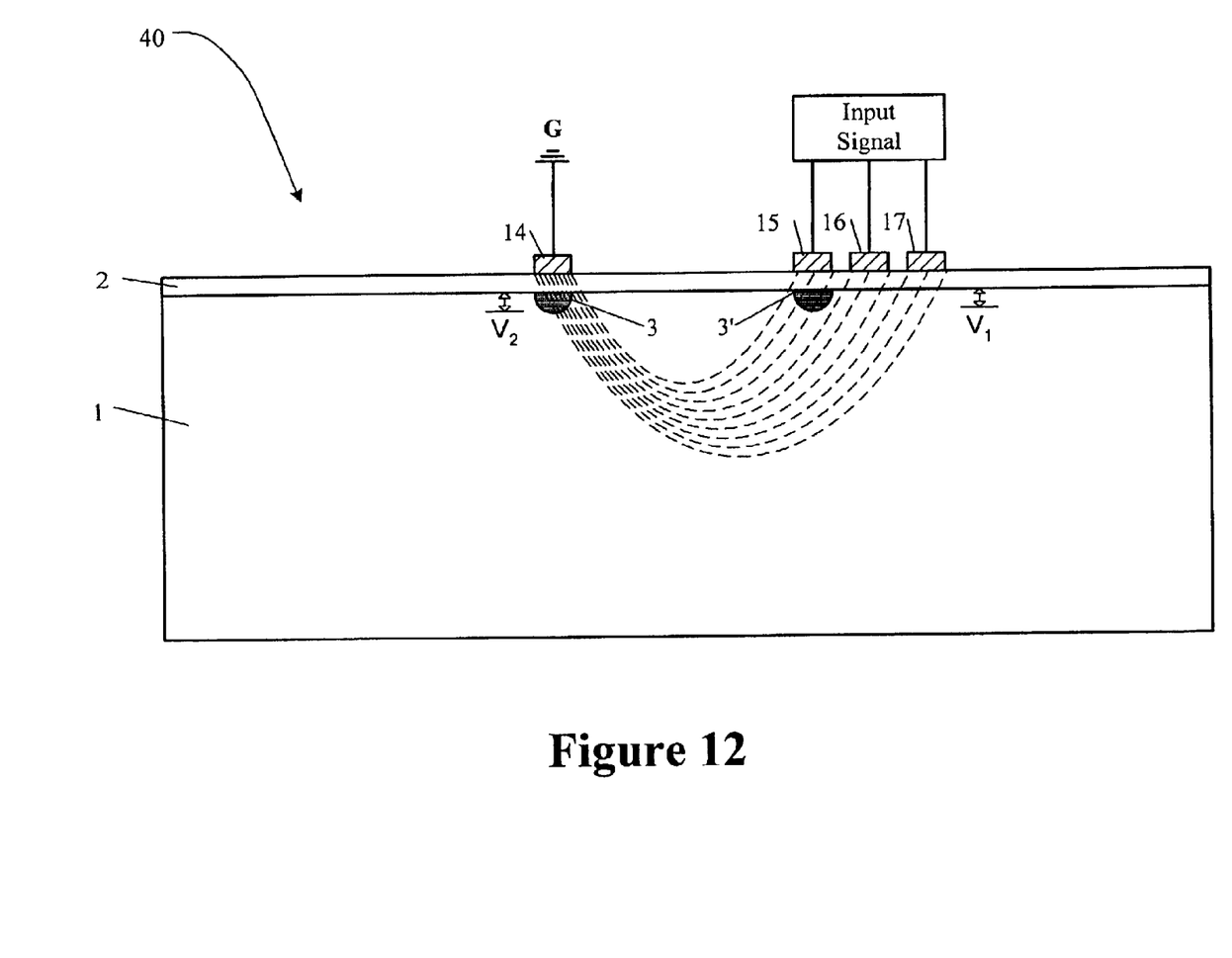
FIG. 12 is a cross-sectional view of an exemplary EOM in accordance with a fourth embodiment of the present invention.

FIG. 12 illustrates an exemplary EOM 40 in accordance with a fourth embodiment of the present invention. In EOM 40, both the first and second programming electrodes 16, 17 are permanently or removably connected to a signal input, as opposed to foregoing embodiments in which the programmable electrodes were selectively permanently or removably connected to ground. Therefore, similar to the programming electrodes described above, first and second (or more) programmable electrodes can be permanently or removably connected to spread the electric field outward in an area of a waveguide arm, and thus cause a difference between potentials $V_2$ and $V_1$. Electric fields for the programmable chirp EOM 40 in FIG. 12 look similar to the field shown in FIG. 7, but the outward spread of the electric field is in an opposite arm of the interferometer. The same programming methods disclosed with regard to FIGS. 4–11 using the ground electrodes can be used in combination with the above-described arrangement for EOM 40 for programming a desired chirp, i.e., by additionally choosing an appropriate number of programming electrodes, selectively permanently or removably connecting one or more programming electrodes to a input signal, adjusting the width and/or spacing of electrodes 15–17, and/or confining the electric field with the use of trench structures.

It will be apparent to those skilled in the art that various modification and variations can be made in the apparatus for of the present invention without departing from the scope or spirit of the inventions. Thus, it is intended that the present invention covers the modifications and variations of this invention provided they come within the scope of the appended claims and their equivalents.

What is claimed is:

1. A programmable chirp optical modulator comprising:
    a substrate having an electrooptic property;
    a waveguide within the substrate, wherein the waveguide includes a first main channel branching into first and second waveguide arms near one end of the substrate, the first and second waveguide arms coupling near another end of the substrate to provide a second main channel;
    a first coplanar-strip electrode overlying and substantially parallel with a portion of the first waveguide arm;
    a second coplanar-strip electrode overlying and substantially parallel with a portion of the second waveguide arm; and
    at least one programmable coplanar-strip electrode overlying the substrate and adjacent to the second coplanar-strip electrode on a side of the second coplanar-strip electrode opposite a side of the second coplanar-strip electrode where the first coplanar-strip electrode is located, wherein the at least one programmable coplanar-strip electrode is substantially parallel with and selectively connectable to the second coplanar-strip electrode to adjust a chirp value of a signal output from the optical modulator.

2. The programmable chirp optical modulator according to claim 1, wherein the number of programmable coplanar-strip electrodes is at least two.

3. The programmable chirp optical modulator according to claim 1, further comprising:
    an input signal applied to the first coplanar-strip electrode; and
    a ground potential relative to the input signal applied to the second coplanar-strip electrode and at least one of the at least one programmable coplanar-strip electrodes, wherein a modulated optical output of the programmable optical modulator has a chirp value corresponding to the number of the programmable electrodes connected to ground.

4. The programmable chirp optical modulator according to claim 1, further comprising:
   a ground signal applied to the first coplanar-strip electrode; and
   an input signal relative to the ground potential applied to the second coplanar-strip electrode and at least one of the at least one programmable coplanar-strip electrodes, wherein a modulated optical output of the programmable optical modulator has a chirp value corresponding to the number of the programmable electrodes connected to the input signal.

5. The programmable chirp optical modulator according to claim 4, wherein the optical output of the modulator has positive chirp.

6. The programmable chirp optical modulator according to claim 1, further comprising:
   a first trench positioned in the substrate adjacent to the at least one programmable coplanar-strip electrode on a side of the programmable coplanar-strip electrode opposite the second coplanar-strip electrode; and
   a second trench positioned in the optical modulator chip adjacent to the first coplanar-strip electrode on a side of the first coplanar-strip electrode opposite the second coplanar-strip electrode.

7. The programmable chirp optical modulator according to claim 6, wherein at least two of the programmable coplanar-strip electrodes overlie the substrate between the first trench and the second coplanar-strip electrode.

8. The programmable optical modulator according to claim 6, further comprising:
   an input signal applied to the first coplanar-strip electrode; and
   a ground potential relative to the input signal applied to the second coplanar-strip electrode and at least one of the at least one programmable coplanar-strip electrodes, wherein a modulated optical output of the programmable optical modulator has a chirp value corresponding to the number of the programmable electrodes connected to ground.

9. The programmable chirp optical modulator according to claim 6, further comprising:
   a ground signal applied to the first coplanar-strip electrode; and
   an input signal relative to the ground potential applied to the second coplanar-strip electrode and at least one of the at least one programmable coplanar-strip electrodes, wherein a modulated optical output of the programmable optical modulator has a chirp value corresponding to the number of the programmable electrodes connected to the input signal.

10. A optical modulator, comprising:
   a substrate having electrooptic properties;
   a waveguide within the optical modulation chip, wherein the waveguide includes a first main channel branching at a first junction into at least a first waveguide arm and second waveguide arm, the second waveguide arm being substantially parallel to the first waveguide arm, and a second main channel joining the first and second waveguide arms at a second waveguide junction;
   a first electrode overlying and running along a portion of the first waveguide arm;
   a second electrode overlying and running along a portion of the second waveguide arm;
   a third electrode overlying the substrate and adjacent to the second electrode on a side of the second electrode opposite a side of the second electrode where the first strip is located, wherein the third electrode runs along with and is substantially parallel with a portion of the second electrode;
   a first electrical bias source connected to the first electrode; and
   a second electrical bias source connected to the second and third electrode.

11. The optical modulator of claim 10, wherein the first electrical bias is a ground potential and the second electrical bias source is a communication signal.

12. The optical modulator of claim 10, wherein the second electrical bias is a ground potential and the first electrical bias source is a communication signal.

13. The optical modulator of claim 10, wherein the first and second trenches are filled with an insulating material.

* * * * *